(12) United States Patent
Johnson et al.

(10) Patent No.: US 6,299,677 B1
(45) Date of Patent: Oct. 9, 2001

(54) BINDERS FOR CORES AND MOLDS

(75) Inventors: Calvin K. Johnson, Lockport; Kwok-tuen Tse, Berwyn; Leonid S. Zaretskiy, Chicago, all of IL (US); Brian E. Algar, Southampton (GB)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/202,937

(22) PCT Filed: May 23, 1997

(86) PCT No.: PCT/US97/08611

§ 371 Date: May 25, 1999

§ 102(e) Date: May 25, 1999

(87) PCT Pub. No.: WO97/49646

PCT Pub. Date: Dec. 31, 1997

Related U.S. Application Data

(60) Provisional application No. 60/020,401, filed on Jun. 25, 1996.

(51) Int. Cl.[7] .................................................. C04B 12/04
(52) U.S. Cl. ....................... 106/38.2; 106/38.22; 106/603
(58) Field of Search ............................. 106/38.2, 38.22, 106/603

(56) References Cited

U.S. PATENT DOCUMENTS

| | | |
|---|---|---|
| 2,541,674 | 2/1951 | Snyder . |
| 2,895,838 * | 7/1959 | Ilenda . |
| 2,964,415 | 12/1960 | Payne, Jr. et al. . |
| 4,183,759 * | 1/1980 | Epstein . |
| 4,226,277 | 10/1980 | Matalon . |
| 4,331,197 | 5/1982 | Cole . |
| 4,416,694 | 11/1983 | Stevenson et al. . |
| 4,423,764 | 1/1984 | Seeney et al. . |
| 4,504,314 | 3/1985 | Barker et al. . |
| 4,530,722 * | 7/1985 | Moore et al. ...................... 106/38.35 |
| 4,859,358 * | 8/1989 | Gabriel et al. . |
| 4,983,218 | 1/1991 | Mascioli . |
| 5,000,933 | 3/1991 | Novotny et al. . |
| 5,215,732 | 6/1993 | Hachgenei et al. . |
| 5,711,792 * | 1/1998 | Miller ................................ 106/38.22 |

FOREIGN PATENT DOCUMENTS

| | | |
|---|---|---|
| 246488 | 6/1987 | (DD) . |
| 2029701 | 12/1971 | (DE) . |
| 2856267A1 | 7/1980 | (DE) . |
| 16889 * | 1/1986 | (EP) . |
| 186234 * | 7/1986 | (EP) . |
| 641748 * | 3/1995 | (EP) . |
| 2086367 * | 2/1972 | (FR) . |
| 2096863 | 3/1972 | (FR) . |
| 1283301 | 7/1972 | (GB) . |
| 1309092 * | 3/1973 | (GB) . |
| 1384820 * | 2/1975 | (GB) . |
| 2219596 * | 2/1989 | (GB) . |
| 52-20927 | 2/1977 | (JP) . |
| 55-19463 | 2/1980 | (JP) . |
| 56-079177 * | 6/1981 | (JP) . |
| 56-169172 * | 12/1981 | (JP) . |
| 57-056039 * | 11/1982 | (JP) . |
| 58-029897 * | 2/1983 | (JP) . |
| 58-052383 * | 3/1983 | (JP) . |
| 61-291680 * | 12/1986 | (JP) . |
| 04063898 * | 2/1992 | (JP) . |
| 2000119582 * | 4/2000 | (JP) . |
| 1107948 | 8/1984 | (SU) . |
| 1335366 | 9/1987 | (SU) . |
| 1338959 | 9/1987 | (SU) . |
| 530498 | 12/1987 | (SU) . |
| 1366277A1 | 1/1988 | (SU) . |
| 1678497 | 9/1991 | (SU) . |
| 1678497A1 | 9/1991 | (SU) . |
| 1704900 | 1/1992 | (SU) . |
| 1704900A1 | 1/1992 | (SU) . |
| 1724415 | 4/1992 | (SU) . |
| 801365 | 5/1992 | (SU) . |
| 80/01254 | 6/1980 | (WO) . |
| 92/06808 | 4/1992 | (WO) . |
| 9414555 | 7/1994 | (WO) . |
| 9515230 | 6/1995 | (WO) . |

OTHER PUBLICATIONS

Kirk–Othmer Chemical Encyclopedia; James S. Falcone, Jr.; p. 867; 1980.

Sand Cores and Coremaking; ASM Committee on Sand Molding; pp. 209–221 (prior to 1996).

Y.A. Owusu and A. B. Draper; "Inorganic Additives Improve the Humidity Resistance And Shakeout Properties of Sodium Silicate Bonded Sand"; *AFS Transactions;* pp. 47–54 (1980).

* cited by examiner

Primary Examiner—Paul Marcantoni

(57) ABSTRACT

No-bake inorganic binder compositions for binding particulate material and methods for curing such inorganic binders. The inorganic binder compositions are composed of silicate and phosphate components. The no-bake compositions further contain curing catalyst such as a catalyst selected from the group consisting of aliphatic carbonates, cyclic alkylene carbonates, aliphatic carboxylic acid esters, cyclic carboxylic acid esters, phosphate esters and mixtures thereof. The composition produces a binder having the advantageous strength properties of a silicate binder system with the water breakdown properties of a phosphate binder system. Thus, relative to an all-silicate binder system, the present invention has improved mechanical shakeout and improved water collapsibility. Also, relative to conventional all-phosphate binder system, the present invention has superior hot strength, i.e., the foundry cores and molds do not soften at elevated temperatures. Methods of making and using the binder compositions and the resulting products are of particular interest to the foundry art.

46 Claims, No Drawings

BINDERS FOR CORES AND MOLDS

This application is a national stage of PCT/US97/08611 filed May 23, 1997 and claims benefit of Provisional Appln 60/020,401 filed Jun. 25, 1996.

FIELD OF THE INVENTION

The present application relates generally to "no-bake" inorganic binder systems for particulate material having particular utility in the manufacture of molds, cores, mandrels, or other shapes which can be used in the production of metal and non-metal parts.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder system. Organic and inorganic systems are currently used as binders in forming shapes from a mixture containing an aggregate material, such as sand. Typically, after the aggregate material and binder have been mixed, the resultant mixture is rammed, blown or otherwise formed to the desired shape or patterns, and then cured with the use of catalyst and/or heat to a solid, cured state.

In the foundry industry, the binder is typically from about 0.4 to about 6 percent by weight of the coated particle. Such binder coated foundry particulates have a particle size in the range of USA Standard Testing screen numbers from 16 to about 270 (i.e., a screen opening of 0.0469 inch to 0.0021 inch).

Typically, the particulate substrates for foundry use are granular refractory aggregate. Examples of refractory aggregates include silica sand, chromite sand, zircon sand, olivine sand, etc. and mixtures thereof. For purposes of the disclosure of the present invention such materials are referred to as "sand" or "foundry sand".

Regardless of the type of organic binder system, the organic binder used to produce desired shapes will volatilize during curing and/or bum out at metal pouring temperatures. Such processes produce smoke, odors and additional unwanted and harmful emissions which can result in the need to comply with applicable local and central government regulations. Another deficiency of some organic binder systems is their relatively short bench life. To obviate the deficiencies of the organic systems, some foundries use inorganic binder systems. One type of inorganic binder which is widely applied is an aqueous solution of a silicate, such as sodium silicate, i.e., water glass. (See U.S. Pat. No. 4,226,277 herein incorporated by reference). The solution usually contains 40–50% by weight of a sodium silicate having a weight ratio of $SiO_2:Na_2O$ from 2.0:1 to 3.2:1.

U.S. Pat. No. 4,504,314, herein incorporated by reference, discloses mixing alkali metal silicate, glycosylated polyhydric alcohols, and optionally an oxyanion salt, with sand, and the resultant mixture is formed into a mold or core. After production, carbon dioxide gas is then blown through the mold or core. Due to the chemical reaction between the sodium silicate and the carbon dioxide, a bounded mold or core is formed.

In another method, deemed the self-set silicate process (or the "no-bake" process) described by Highfield et al, "The Mechanism, Control and Application of Self-Setting Sodium Silicate Binder Systems", AFS Transactions (1982) Vol. 90, pp. 201–214 (herein incorporated by reference), curing or hardening of the silicate shape is accomplished by the addition of organic esters as catalysts in the particulate mixture.

U.S. Pat. No. 4,416,694, herein incorporated by reference, discloses a foundry sand composition which comprises particulate sand, aqueous sodium silicate as binder and alkylene carbonate as hardener.

U.S. Pat. No. 4,983,218, herein incorporated by reference, discloses that aqueous solutions of alkali metal silicate are hardened using blends of alkylene carbonates and aliphatic alcohols such as alkylene diols, polyalkylene glycols, or hydroxyalkyl ethers.

Although the binding properties of the silicates are generally satisfactory they, when compared to organic systems, exhibit lower flowability of the binder/aggregate mixture due to the high viscosity of the silicate and relatively high binder levels required for adequate strength. Additionally, when subjected to metal pouring or casting temperatures, the silicates tend to fuse making it difficult to remove the fused shapes from castings by mechanical shakeout methods. The fused shapes also lack water solubility which prevents their removal or dissolution by water dispersing.

A second inorganic system, comprised of an aqueous solution of a polyphosphate glass is disclosed in WO 92/06808 which is herein incorporated by reference. These binders, when cured, exhibit satisfactory strengths, excellent rehydration, and breakdown of the aggregate shape after being exposed to metal casting temperatures. Deficiencies of this binder system include: poor humidity resistance, softening of the aggregate system at high temperatures, which restricts its use in ferrous alloy applications; and when compared to the organic binders, low flowability of the aggregate due to relatively high binder levels required for adequate strengths.

A third inorganic system is known which is comprised of a major portion of a finely-divided refractory material mixed with a minor portion of a dry phosphate to which is subsequently added a minor portion of an aqueous alkali metal silicate as disclosed in U.S. Pat. No. 2,895,838 (the entire disclosure of which is incorporated by reference) to make gas curable molds. This composition is chemically reacted with a gaseous agent, such as carbon dioxide, to cure the composition by reacting the binder with an alkali metal carbonate formed on curing of the inorganic system with carbon dioxide.

Another known inorganic binder system, which includes a combination of silicate and polyphosphate, is disclosed in the work of D. M. Kukuj et al, "Modification of Waterglass with Phosphorus Containing Inorganic Polymers" (hereinafter "Kukuj et al", the entire disclosure of which is incorporated by reference). The method of preparing this binder involved processing of the silicate and polyphosphate at higher than ambient temperatures and pressures in an autoclave to cause a chemical reaction of the inorganic polymers. The binder was then coated onto sand and was cured using $CO_2$ at ambient temperatures. By this work, only a low level of polyphosphate could be incorporated in the binder preparation. In addition, Kukuj et al found that the maximum strength system had only 5% polyphosphate modifier and the strength dropped off dramatically when the binder contained more than 7% polyphosphate. Kukuj et al also found that small additions of polyphosphate in their binder (about 1 to 3%) caused a dramatic increase in viscosity of the binder prior to its addition to aggregate. Thus, the deficiencies of this system include: high temperature and high pressure processing required to produce the binder; formation of new chemical compounds with high viscosity; and low flowability of the binder/aggregate system. Also, like U.S. Pat. No. 2,895,838, chemical interaction of the binder system with a carbon dioxide containing gas was necessary to cure the system.

SUMMARY OF THE INVENTION

It is a principal object of the invention to provide novel binder systems as a substitute for organic and inorganic binder systems known in the prior art.

The present inventors have conducted extensive studies on silicate/phosphate/catalyst systems and they have achieved unexpected results in view of the results disclosed in U.S. Pat. No. 2,895,838 and by Kukuj et al. The present inventors have learned that particular silica/soda ratios are beneficial to achieving useful products. The present inventors have also learned that use of certain catalysts in the "no-bake" process give superior flexibility to the process for achieving useful products such that the binder systems of the present invention are not limited to narrow silica/soda ratios, nor silicate/phosphate ratios, but are effective over a wide range of proportions.

The novel inorganic binder and aggregate systems neither fuse nor soften at high, e.g., 500° C., temperature. Thus, they are useful with refractories and foundry sands employed as foundry molds or cores in contact with molten metal, including ferrous metal casting processes. Moreover, the binder systems of the present invention produce good strength properties in shapes of aggregate bound with the binder of the invention. The present invention advantageously provides for binders for aggregate to achieve molds and cores which are water collapsible even after exposure to a temperature up to 1400° C., e.g., exposure to temperature in the range of 500 to 1200° C.

The phosphates may be orthophosphates, condensed phosphates or mixtures thereof. The phosphates may also be made in situ, in the presence of other ingredients, e.g., silicate and/or aggregate, by addition of a phosphoric acid and base, e.g., sodium hydroxide, or converted from one phosphate to another in situ by addition of acid or base.

An object of the present invention is to produce a binder system that when mixed with a particulate material can be used to make usable shapes with satisfactory handling and processing properties.

Another object of the invention is to produce a silicate, phosphate and catalyst-containing binder composition that is curable by the "no-bake" process.

Another object of the present invention is to produce an array of binder compositions containing catalyst, silicate and phosphate that, when mixed with a particulate material, can be used to prepare usable shapes.

Another object of the invention is to produce a silicate binder system containing phosphates and catalyst for metal, e.g., ferrous, casting.

Another object of the invention is to produce a silicate binder system containing phosphates and catalyst for non-ferrous and non-metal molding.

Another object of the invention is to produce an array of binder compositions which contain phosphate, silicate and catalyst for formed aggregate shapes that exhibit good shakeout or water collapsibility properties after exposure to molten metal casting temperatures for easy removal of the formed shape.

Other objects of the invention are to provide methods of making and methods of using the novel binder systems of the invention to overcome problems associated with the prior art and to form useful cured shapes suitable as molten polymer and metal contacting surfaces, including casting and injection molds, foundry molds, cores and mandrels.

These and other objects of the invention will become apparent after consideration of the following descriptions and examples.

DETAILED DESCRIPTION OF THE INVENTION

The present inventors have found that inorganic binder systems composed of silicates and phosphates are quite versatile for binding particulate material in the manufacture of, for instance, cores, molds, mandrels, particle board, plastic compositions, briquettes and the binding of other shapes producing shapes having good strength with improved collapsibility and water solubility. The inventors have found that a number of variables in the inorganic binder system can be adjusted so that a formulator can tailor a product to the needs of a client. For instance, the formulator can easily adjust the relative amounts of silicate and phosphate to change properties of a particular shape that is formed. Additionally, the use of a specific phosphate or silicate can be chosen by the formulator to obtain the desired results. Additionally, the inventors can vary the work time of the inorganic binder system by selection of an appropriate catalyst.

One can improve mechanical and wet shakeout properties of formed shapes exposed to molten metal temperatures by using the binders of the invention rather than a binder containing 100% silicate. In addition, the present invention permits the use of phosphate, whereas an all phosphate material would not even act as a binder in a no-bake system. These results can be obtained, even with greater amounts of phosphate present in the binder system than the amounts disclosed in either U.S. Pat. No. 2,895,838 or Kukuj et al.

Silicates

The silicates used in the binders of the invention may include the various alkali metal silicates including potassium, sodium and lithium. Other silicates such as ammonium silicates may be used. Generally, the silicates are commercially available as solids or aqueous solutions. Throughout the present application, the silicates, as a component of the binder of the invention, are preferably aqueous alkaline solutions characterized by a solids content of about 43% by weight unless otherwise specified. A solid silicate may optionally be used.

Water glass, i.e., sodium silicate dissolved in water, which is the preferred alkali metal silicate used in the binder of the invention, can be characterized by the general formula $xSiO_2 \cdot yNa_2O$. When employed in compositions of the present invention intended for curing by the no-bake process, the weigth ratio of x and y, i.e., silica/soda used in the present invention is from 1.1:1 to 3.85:1, preferably 1.6:1 to 3.3:1 and more preferably 2.0:1 to 2.7:1. Minor amounts of other elements such as alkaline earth metals, aluminum and the like may be present in varying proportions. Water content of sodium silicate liquid can vary, depending on the properties, e.g., viscosity, desired by the end user.

Phosphates

The phosphates used in the binders of the invention include a salt of an oxygen acid of phosphorus including salts of phosphoric acids such as orthophosphoric acid, polyphosphoric acid, pyrophosphoric acid, and metaphosphoric acid. The phosphate employed are selected from alkali metal phosphates and ammonium phosphates.

As used throughout the specification and claims, the term "phosphate" is intended in a generic sense to include both crystalline and amorphous inorganic phosphates, e.g., sodium phosphate gasses. Further, the phosphate is intended to include but not be limited to orthophosphates and condensed phosphates. Orthophosphates are compounds having a monomeric tetrahedral ion unit $(PO_4)^{3-}$. Typical orthophosphates include sodium orthophosphates, e.g., monosodium phosphate, disodium phosphate or trisodium phosphate, potassium orthophosphates and ammonium orthophosphates.

Condensed phosphates are compounds having more than one phosphorus atom, wherein the phosphorus atoms are not bonded to each other. However, each phosphorus atom of the pair is directly bonded to at least one same oxygen atom, e.g., P-O-P. The general class of condensed phosphates in the present application includes linear polyphosphates, metaphosphates, pyrophosphates and ultraphosphates.

Metaphosphates are cyclic structures including the ionic moiety $((PO_3)n)^{n-}$, wherein n is at least 3, e.g., $(Na_3(PO_3)_3)$. Ultraphosphates are condensed phosphates in which at least some of the $PO_4$ tetrahedra share 3 corner oxygen atoms. Pyrophosphates have an ion of $(P_2O_7)^{4-}$, e.g., $Na_n$ $H_{4-n}$ $(P_2O_7)$ wherein n is 0 to 4.

Linear polyphosphates have linear P-O-P chains and include an ionic moiety of the general formula $((PO_3)_nO)$, wherein n is the chain length which ranges from 3 up to several hundreds, e.g., 500, dependent on the number of chain breakers, e.g., $H_2O$, present. Commercial polyphosphate generally contains mixtures of linear polyphosphates and often also metaphosphates and is characterized by an average chain length $n_{avg}$ which ranges from at least 3, typically from 3 to about 45 and is limited to 45 only by market demands, preferably the average ranges from 3 to 32, most preferably 4 to 21. A preferred category of polyphosphate is that of amorphous condensed phosphates, e.g., water soluble phosphate glasses.

In view of the above teachings, one skilled in the art could produce mixtures of phosphates as defined above and even include small amounts (up to 10%) of modifier ions such as calcium, magnesium, zinc, aluminium, iron or boron in soluble phosphates and produce a phosphate as covered by the range of the present invention.

In general the phosphates are encompassed by the following formula for oxide molar ratio:

$$(x\, M_1 + y\, M_2 + z\, H_2O) : P_2O_5,$$

wherein $M_1$ is selected from the group consisting of $Li_2O$, $Na_2O$, $K_2O$, and $(NH_3)_2 \cdot (H_2O)$ and mixtures thereof. $M_2$ is optional and selected from the group consisting of CaO, MgO, ZnO, FeO, $Fe_2O_3$, $Al_2O_3$, $B_2O_3$. The total oxide ratio R equals moles $(x+y+z)$/moles $P_2O_5$ and ranges from about 0.5 to 3.0 or greater, e.g., 5. Typically, phosphates are categorized according to the value of R as follows in Table A.

TABLE 1

| R | Phosphate |
|---|---|
| $0.5 \leq R < 1$ | ultraphosphates |
| R = 1 | metaphosphates |
| $1 < R < 2$ | polyphosphates |
| R = 2 | pyrophosphates |
| $2 < R < 3$ | mixtures of phosphates |
| R = 3 | orthophosphates |
| $3 > R$ | phosphates plus metal oxide |

It should be noted that the phosphates may be added directly to other ingredients, e.g., aggregate or silicates, or created in situ with the other ingredients. In situ creation may be accomplished by using acids, e.g., any of the phosphoric acids, or bases, e.g., alkali hydroxides, or oxides. For example, phosphoric acid and sodium hydroxide could be added together or sequentially to make a phosphate in situ with other binder ingredients. As would be apparent to one skilled in the art from reading the present disclosure, the base hydroxide ions may be added, e.g., provided by added sodium hydroxide, or provided by the silicate. Phosphates may even convert in situ to other phosphates by addition of base or acid. For example, disodium phosphate may be converted to trisodium phosphate, by addition of sodium hydroxide, or converted to monosodium phosphate, by addition of phosphoric acid.

The phosphates may be used in solid form or as aqueous solutions. The pH of the aqueous solutions may be acidic or alkaline. For condensed phosphates, pH relates to factors such as the chain length of the phosphate.

Catalyst

A number of catalysts were found to cure particulate samples mixed with the two-component silicate/phosphate binders. The catalysts include a catalyst selected from the group consisting of aliphatic carbonates, cyclic alkylene carbonates, aliphatic carboxylic acid esters, cyclic carboxylic acid esters, phosphate esters and mixtures thereof.

Aliphatic carbonates include those having the following Formula I:

wherein $R^1$ and $R^2$ may be the same or different and are selected from $C_1$ to $C_6$ alkyl. The aliphatic carbonates preferably have 3 to 7 carbon atoms such as dimethyl carbonate, diethyl carbonate, dipropyl carbonate or mixtures thereof.

Cyclic alkylene carbonates include those having the following Formula II:

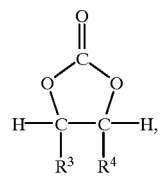

wherein $R^3$ and $R^4$ are independently selected from the group consisting of hydrogen and $C_1$ to $C_{10}$ alkyl. Preferred, cyclic carbonates include alkylene carbonate such as ethylene carbonate, propylene carbonate, butylene carbonate or mixtures thereof. Moreover, typically where an alkylene carbonate is employed there may be an absence of aliphatic alcohol.

Aliphatic carboxylic acid esters are made up of an aliphatic carboxylic acid moiety and an aliphatic alcohol moiety.

The aliphatic carboxylic acid moiety includes monocarboxylic acid having 1 to 20 carbon atoms, typically 1 to 6 carbon atoms, and dicarboxylic acids having 2 to 20 carbon atoms, typically 2 to 6 carbon atoms. (In the present specification, the alkyl and alkylene groups can be branched or unbranched, as well as saturated or unsaturated.)

The aliphatic alcohol moiety includes aliphatic alcohols, aliphatic polyols, ether alcohols and ether polyols. Aliphatic alcohols are saturated or unsaturated alkyl alcohols having 1 to 20 carbon atoms, typically 1 to 6 carbon atoms. Aliphatic ether alcohols are saturated alcohols or unsaturated alcohols having the following Formula III (a):

 III (a), wherein $R^5$ is a saturated or unsaturated alkyl moiety having from 1 to 20 carbon atoms, typically 1 to 6 carbon atoms, each $R^6$ is independently an alkylene moiety having from 2 to 4, linear or branched, carbon atoms, and m is an integer from 1 to 8.

Aliphatic polyols are saturated or unsaturated alkyl polyols having 2 to 20 carbon atoms, typically 2 to 6 carbon atoms. Aliphatic ether polyols are saturated or unsaturated polyols having the following Formula III (b):

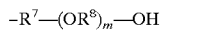 III (b), wherein $R^7$ is a saturated or unsaturated alkyl moiety having from 1 to 20 carbon atoms, typically 1 to 6 carbon atoms, each $R^8$ is independently an alkylene moiety having from 2 to 4, linear or branched, carbon atoms, and m is an integer from 1 to 8, with the proviso that at least one of $R^7$ or $R^8$ is hydroxy substituted in addition to the hydroxy group shown in Formula III (b).

Typical aliphatic carboxylic acid esters include those of Formula IV (a):

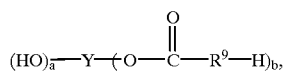 IV(a)

wherein a is an integer from 0 to 5, b is an integer from 1 to 6, and $R^9$ is $C_1$ to $C_{20}$ alkylene. Y is saturated and has the formula $C_c H_{2c-a-b+2}$, wherein c is an integer from 2 to 20, typically an integer from 2 to 6. The sum of a and b is an integer from 1 to at most the lesser of 6 or c. For example, where a equals 1, b equals 2, c equals 3, Y is saturated, and $R^9$ is $CH_2$. The Formula IV(a) represents the following structure IV (b):

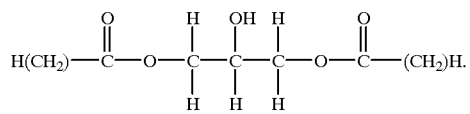 IV(b)

and isomers thereof.

Optionally, compounds of Formula IV (a) may include one or more ether groups of formula $(OR^6)_m$ between Y and the —OH or —O(CO)$R^9$H groups. Each $R^6$ is independently an alkylene moiety having from 2 to 4 linear or branched carbon atoms and each m is independently an integer from 1 to 8. Examples of esters of Formula IV (a) which also contain ether groups include compounds having Formula IV (c):

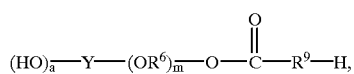 IV(c)

wherein a, Y, $R^6$, m and $R^9$ are as defined above.

A suitable ester, not within Formula IV (a), includes compounds having Formula V:

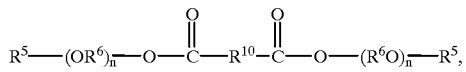 V wherein each $R^5$ and $R^6$ are independently as defined above, n=0 to 8, and $R^{10}$ is a bond or $C_1$ to $C_{18}$ alkylene, typically C to C.

Specific carboxylic acid esters employed in the present invention include dimethyl succinate, dimethyl glutarate, dimethyl adipate, monoacetin, diacetin, triacetin, ethylene glycol diacetate and diethylene glycol diacetate.

Cyclic carboxylic acid esters are those of the following Formula VI:

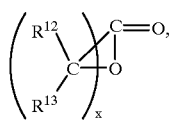 VI wherein x equals 2 to 10 and $R^{12}$ and $R^{13}$ are independently selected from the group consisting of hydrogen and $C_1$ to $C_4$ alkyl. The bonded repeating units of Formula VII:

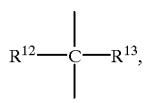 VII need not be identical. Typical cyclic carboxylic acid esters include propiolactone, butyrolactone, or caprolactone.

Phosphate esters are those of the following Formula VIII:

 VIII, wherein each $R^{14}$ is independently selected from the group consisting of H, $C_1$ to $C_{16}$ linear or branched alkyl, —$C_6H_5$, —$C_6H_4R^{15}$, wherein $R^{15}$ is $C_1$ to $C_{12}$ linear or branched alkyl, and $R^{16}$—$C_6H_5$, wherein $R^{16}$ is linear or branched $C_1$ to $C_6$ alkylene, at most two $R^{14}$ groups being H. Preferably, each $R^{14}$ is methyl or ethyl.

Generally from about 5 to about 25 percent by weight of the binder is catalyst. For example, typical binders may include about 8 to about 20 percent catalyst by weight of the binder. Preferably, about 10 to about 18 percent by weight of the binder is catalyst.

Particulate

The silicate/phosphate binder components can be used to mold shapes of water-insoluble particulate material made up of, for example, plastics, earth, wood and typically of a refractory material such as silica, zircon, alumina, chromite, chamotte, olivine, silicon carbide, magnesite, dolomite, aluminum silicate, mullite, carbon, forsterite, chrome ore-magnesite and mixtures thereof. The mold, core, or mandrel is produced from any of the sands identified above for shaping products for foundry uses or other metal forming uses, for casting products of, for instance, cast iron, brass, bronze, aluminum and other alloys and metals. The molds, cores, or mandrels of the present invention may also be used for shaping non-metals, e.g., plastics or ceramics. Sand molds, cores, and mandrels are well known to those of ordinary skill in the art.

Binder

The amount of a particular binder component (silicate or phosphate component) and the total binder amount used to create a shape, such as a mold, core, or mandrel depends on the strength requirements as well as the shakeout and/or water collapsibility requirements of the shape.

The total weight percent of the binder, based on the weight of the particulate material used to form a shape, is defined by the amount of solids present in the combined binder components unless otherwise specified. In the present invention, weight percent solids of the binder, based on the weight of particulate material, is 0.4–5.0%, preferably 0.4–2.5%, and more preferably 0.5–2.0%.

The ratio of silicate/phosphate in the binder formed of a silicate component and phosphate component of the invention is about 97.5:2.5 to about 40:60; preferably about 95:5 to 60:40.

Additives

Additives are used for special requirements. The binder systems of the invention may include a wide variety of additional materials. Such materials include alkaline hydroxides, e.g., NaOH, water and various organic and inorganic additives. NaOH (45%–50% solutions for example) may be present in the binder of the invention in amounts of up to 10%–40% by weight (solutions). Preferably, aqueous binders of the present invention contain water in an amount from about 40 to about 70% by weight of the total aqueous binder. Minor amounts of other additives, such as surfactants, may be present. The surfactants may be anionic, nonionic, cationic, amphoteric or mixtures thereof. Examples of water soluble surfactants are anionic surfactants selected from organic sulphates, organic sulphonates and organic phosphate esters, e.g., potassium 2-ethylhexyl phosphate. Certain surfactants also operate as flow control agents. A typical flow control agent includes an agent sold under the tradename PA 800K, more completely defined as potassium 2-ethylhexyl phosphate which is commercially available from LAKELAND LABORATORIES Ltd., Manchester, England. Other flow control agents include 2-ethylhexyl acid phosphate, DISPERSE-AYD W28 anionic/non-ionic surfactant sold by Daniel Products, Jersey City, N.J., USA, and DISPEX N40V, a sodium salt of a polyacrylate sold by Allied Colloids, Suffolk, Va., USA. Other additives include humidity resistant additives, collapsibility (or breakdown) enhancers, preservatives, dyes, bulking agents, hot strength additives, or flow enhancers. Humidity resistant additives include potassium tetraborate, zinc carbonate, zinc oxide. Collapsibility (or breakdown) enhancers include sugar, e.g., sucrose, dextrin and sawdust. Still other additives include mold release agents, adhesion promoters, e.g., silanes, metal casting improvement additives, e.g., red iron oxide, black iron oxide, or clay, etc. Refractory coatings may be used to improve casting finishes. Of course, the additives may be added in combination or singly.

Mixing the Binder and Particulate

In general, a sufficient amount of catalyst for curing a binder is admixed to a foundry aggregate. Then, the silicate and phosphate binder components are added simultaneously or separately to the aggregate/catalyst mixture. Thus, one approach is to admix the aqueous phosphate with the foundry aggregate/catalyst mixture and then admix the alkaline aqueous sodium silicate solution having an appropriate ratio of silica to soda with the foundry aggregate/catalyst/phosphate mixture. A flow agent is optionally added at any stage during mixing. The resulting admixture is shaped and then self-cured to form a shaped product, e.g., sand core or mold.

Alternatively, a solid phosphate component may be included in the particulate, which is first mixed with water, and then an aqueous alkaline sodium silicate solution is added thereto. This composition is well mixed. The catalyst may be admixed at any stage in making this mixture. However, preferably it is added before the silicate solution.

In yet an additional alternative, the silicate and phosphate components can be premixed together to form an aqueous solution and even stored in this condition prior to being added to sand. In at least some embodiments the premixed solution is a clear (transparent) mixture at least prior to mixture with aggregate. The curing catalyst would be added to the aqueous solution simultaneously, just prior to, or after, mixing the premixed solution with the aggregate.

In yet another alternative, the silicate, phosphate and aggregate components may be dry mixed and stored in that condition. When ready, water and catalyst may be added to this dry mixture.

In yet another alternative, the silicate, phosphate and dry catalyst, e.g., ethylene carbonate, may be dry mixed and stored in that condition. When ready, water and aggregate may be mixed with this dry mixture.

As an alternative to providing the phosphate as a separate ingredient, it may be formed in situ by adding phosphoric acid and a base as binder ingredients before or after mixing with aggregate or silicate. Moreover, the phosphate in the binder may be changed to a different phosphate in situ by addition of acid or base.

The procedure for mixing binder with water-insoluble particulate may include modifying, if necessary, the silica/soda ratio of the sodium silicate by treating the sodium silicate with an alkali.

After the binder and particulate are mixed, the mixture is charged into a pattern to form a shape and the shape is cured. Generally, curing is accomplished by the action of the catalyst at ambient temperature. However, the shaped mixture may be heated, if desired, to assist curing.

When the mixture is to be cured according to "no-bake" procedures, the mixture of catalyst, aggregate material and binder is shaped and simply permitted to cure. This forms a shaped product such as a foundry core or mold.

The coated particulate material for use in a foundry comprises a sand particle and a resin coating. The particle on which the resin is coated has a precoated size in the range of USA Standard Testing screen numbers from about 16 to about 270, preferably about 30 to about 110.

The binder compositions of this invention may be admixed with a wide variety of particulate materials. At least a binding amount of the binder composition should be present to coat the sand particles and to provide a uniform admixture of the sand and binder. Thus, sufficient binder is present so that when the admixture is shaped as desired and cured, there is provided a strong, uniform, shaped article which is substantially uniformly cured throughout, thus minimizing breakage and warpage during handling of the shaped article, such as, for example, sand molds or cores, so made.

As used throughout the specification and claims, the term "mold" is intended in a generic sense to mean casting forms which include both molds and cores, this invention in no manner being limited to the former. Moreover, "mold" is intended to include various patterns for use in the molding art including casting and injection molds, as well as shell molds including shell mold-forming elements in addition to a completed shell mold structure prepared by assembling two or more complementary thin-walled shell mold elements. Hence, it will be appreciated that the term "mold" is used to include a shaping or casting-defining surface broadly, and specifically encompasses molds, cores and mandrels.

The invention can be further illustrated by reference to the non-limiting examples as set forth below:

The present inventors have found that dog bones prepared by the two-component silicate/phosphate binder system can also be successfully cured by the no-bake process using catalysts which are added to sand/binder mixtures in amounts of up to about twenty-five percent by weight based on the weight of the binder. The methods are described below:

Comparative Example 1 and Examples 1–2

The binder system used in these experiments was comprised of sodium silicate liquid ($SiO_2$ to $Na_2O$ ratio 2.58 having 44.5% solids) and a 45 weight % solution of sodium polyphosphate (BUDIT 4, having an average chain length of 32). These liquid components were pre-mixed in an 83.3 to 16.7 weight ratio, prior to use. This binder was used in the Examples of the present invention shown in Tables 2 and 3.

3000 gm WEDRON 530 silica sand were placed in a Hobart mixing bowl. 10.5 gm catalyst (10 weight %, based on the weight of the binder) were added to the sand and mixed for 1 minute. Such catalyst included diacetin (glyceryl diacetate), triacetin (glyceryl triacetate) and dibasic acid esters sold by DuPont under the designation DBE-9 (a mixture of dimethyl succinate, glutarate and adipate). Then 105 gms of the prepared binder were added and mixed for an additional two minutes. After mixing, resin coated sand was then hand packed into 2 twelve-cavity core boxes to make dog bones. A plastic sheet was used to cover the core boxes to prevent surface drying of the sand mixture.

The surface hardness of the dog bones was monitored to determine bench life and strip time. Bench life is the amount of time available, after the catalyst and binder have been mixed with the sand, for the operator to make the formed shape. After this time has lapsed, the reaction between the catalyst and the binder has proceeded too far for any useful binding of the sand to take place.

Strip time is the time at which the formed shape has reached a strength sufficient for it to be removed from the mold (pattern) without risk of breakage or distortion of the formed shape.

In Examples 1–2 and Comparative Example 1, the time it took the dog bones to reach a surface hardness of 5 psi was defined as bench life of the resin coated sand and the time it took the dog bones to reach a surface hardness of 25 psi was defined as the strip time.

After the strip time was determined the dog bones were removed. Tensile strength of the dog bones was then determined at 4 hours and 24 hours, unless specified, after the coated sand was prepared. All tensile strength measurements were made with an Electronic Tensile Tester Model ZGII-XS (Thwing-Albert Instrument Company, Philadelphia, Pa.). Tensile strength properties are critical in developing a commercial binder system. It is essential that cores and molds made with these binders will have enough strength to be manipulated during core and mold making and handling. Compression strength was determined after the dog bones were subjected to a temperature of 925° C. for 15 minutes and cooled for one hour. The results reported in Table 2 were compared to dog bones prepared with a 100% silicate binder system also cured with the ester.

The parameters of bench life and strip time in Table 2 show that changing the catalyst affects rate of cure.

Table 2 shows tensile strengths of the phosphate-modified systems of Examples 1 and 2 are weaker than the unmodified sodium silicate system of Comparative Example 1. Table 2 also shows the phosphate-modified systems have better shakeout (collapsibility) properties than the un-modified sodium silicate system as indicated by the much lower compressive strength.

TABLE 2

Diacetin, Triacetin and Dibasic Acid Esters as Catalysts

| Example No. | Blends of Diacetin and Triacetin -a | | Dibasic Acid Esters -b |
| --- | --- | --- | --- |
| | Comparative Example 1 | Example 1 | Example 2 |
| Sodium Silicate, 2.58 $SiO_2/Na_2O$ ratio | 100 | 83.3 | 83.3 |
| Sodium Polyphosphate, n = 32 | 0 | 16.7 | 16.7 |
| Bench Life (min.) | 31.5 | >120 | >360 |
| Strip Time (min.) | 59.5 | 169 | >360 |
| Tensile Strength (psi), 4 hrs. | 85 | 51 | ND -c |
| Tensile Strength (psi), 24 hrs. | 198 | 83 | 92 -d |
| Compressive strength (psi) after exposure to 925° C. | 375 | <50 | ND -c | a The catalyst consisted of blends of 15% diacetin and 85% triacetin (by weight).
b Dibasic acid ester sample was obtained as DBE-9 from E. I. DuPont de Nemours & Co., Wilmington, Delaware, USA.
c ND is defined as not determined.
d The dog bones were removed from the gage box after three hours.

Example 3 and Comparative Example 2

3000 gm WEDRON 530 silica sand were placed in a Hobart mixing bowl. 10.5 gm of propylene carbonate catalyst (10% by weight based on the weight of the binder) were added to the sand and mixed for one minute. Then, 105 gm of the combination binder, made according to the procedure of Example 1 was added and then mixed for two additional minutes. Afterwards, the mixture was hand-packed into two twelve-cavity core boxes to make dog bones. A plastic sheet was used to cover the core box to prevent surface drying of the sand mixture.

The surface hardness of the dog bones was monitored. Bench life and strip time were determined as described above. Tensile strength of the dog bones were determined at 2 and 24 hours after the binder was mixed with the sand. Compression strength was also determined after the dog bones were subjected to a temperature of 925° C. for 15 minutes and cooled for one hour. The results reported in Table 3 were compared to dog bones prepared with a 100% silicate binder system also cured with the carbonate.

TABLE 3

Propylene Carbonate as Catalyst

| Example No. | Comparative Example 2 | Example 3 |
| --- | --- | --- |
| Sodium Silicate, 2.58 $SiO_2/Na_2O$ ratio | 100 wt. % | 83.3 wt. % |
| Sodium Polyphosphate, n = 32 | 0 | 16.7 wt. % |
| Bench Life (min) | 5.5 | 8 |
| Strip Time (min) | 12 | 18 |
| Tensile Strength (psi), 2 hrs. | 76 | 70 |
| Tensile Strength (psi), 24 hrs. | 156 | 112 |
| Compressive Strength (psi) after exposure to 925° C. | 300 | <50 |

Examples 4–12

These examples assessed, as catalysts, four esters and one carbonate added at 10 weight % based on resin. The catalysts used were blends of ethylene glycol diacetate (EGDA), diacetin (DA), triacetin (TA), propylene carbonate (PC), and a mixture of dibasic acid esters (DBE) (33% dimethyl succinate, 66% dimethyl glutarate, and less than 1% dimethyl adipate, available from Rhône-Poulenc Basic Chemicals, Staveley, United Kingdom). The sand used was CONGLETON 60, manufactured by Hepworth Limited, Birmingham, England. The binder comprised SB41 (sodium silicate, 42% solids, having a silica/soda ratio of 2.65, available from Crosfield Chemicals, Warrington, England), deionized water, BUDIT 7 (sodium polyphosphate having an average chain length of 16, available from K & K Greeff, Manchester, England), and PA 800K (potassium 2-ethylhexyl phosphate, used as a flow control agent, and available from Lakeland Laboratories Ltd., Manchester, England). The liquid resin was present in an amount of 3% based on sand weight.

The test procedure was as follows.

The combination binder was prepared by mixing 70 parts (by weight) of SB41 (a sodium silicate having a silica to soda ratio of 2.65 and 42.3% solids) with 16.5 parts (by weight) of deionized water. Into this solution was dissolved 13.5 parts (by weight) of BUDIT 7 and finally 0.8 parts (by weight) of PA800K was added and mixed to form a homogeneous solution. This binder was employed in the Examples of Tables 4 and 5.

2500 gm of CONGLETON 60 sand was weighed into the mixing bowl of a Kenwood Chef mixer. Temperature of the sand was adjusted to 20° C. by dry mixing or cold sand addition. The required amount of catalyst (10% by weight of the resin) was weighed into a cup and then transferred to the sand. The cup was then rinsed out with three portions of sand to ensure all the catalyst was transferred into the bowl. The catalyst was mixed with the sand for 1 minute to ensure an even sand/catalyst mixture.

The resin was weighed into a 50 ml plastic disposable syringe. With the mixer running, the resin was injected onto the sand/catalyst mix over a period of 10 seconds. The mixer speed was increased to maximum (300 rpm) for 30 seconds. Coated sand was discharged and used for bench life and strip time measurements and to make samples for flexural strength measurements. These measurements were determined at 20° C.

In the Examples of Tables 4, 5, 6 and 7, bench life and strip time were measured by a slightly different procedure than in the Examples of Tables 2 and 3. For bench life and strip time measurements, coated sand was packed into a plastic tub (10–12 cm deep and 12–15 cm in diameter). Surface hardness of the packed sand in the plastic tub was monitored periodically using a Ridsdale Dietert Scratch Hardness Tester. When surface hardness of the packed sand reached 3 scratch hardness units, the time (from the time at which the resin was added) was recorded as the bench time. Surface hardness measurement was continued until a consistent surface hardness reading in excess of 50 was obtained. The partial cured packed mix was immediately stripped from the tub. Surface hardness at the bottom face of the packed sand was tested until a consistent surface hardness reading in excess of 50 was obtained. The time (from the time at which the resin was added) was noted as the strip time.

For flexural strength measurements, at the same time as the plastic tub for bench life and strip time measurements was packed, the coated sand was hand packed into a gage box which yield samples having a dimension of 18 cm, 2.25 cm and 2.25 cm. After the strip time was determined, the pieces prepared for flexural strength measurements were removed from the gage box. Two samples were measured for flexural strength at 1 hour, 2 hours and 24 hours after stripping using a Tensometer supplied by T. C. Howden, Leaminton Spa, England and fitted with flexural jaws having a 15 cm span.

Table 4 shows various catalyst mixes giving strip times from 12.5 to 32 minutes. All flexural strength results are an average of 2 values unless otherwise indicated. Table 4 lists the weight percent composition of the catalyst portion of the binder.

TABLE 4

| Example No. | 4 | 5 | 6 | 7 | 8 | 9 | 10 | 11 | 12 |
|---|---|---|---|---|---|---|---|---|---|
| Diacetin (wt. %) | 40 | — | — | — | — | — | — | — | — |
| Triacetin (wt. %) | 60 | — | — | — | — | — | — | 20 | 40 |
| Propylene Carbonate (wt. %) | — | 80 | 60 | 40 | 85 | 70 | 55 | 80 | 60 |
| EGDA (wt. %) | — | 20 | 40 | 60 | — | — | — | — | — |
| DBE (wt. %) | — | — | — | — | 15 | 30 | 45 | — | — |
| Bench Life (min.) | 17 | 6 | 7.5 | 9 | 6 | 7 | 10 | 6.5 | 8 |
| Strip Time (min.) | 32 | 12.5 | 15.5 | 19 | 14 | 15 | 17 | 13 | 16 |
| 1 hr. Flexural Strength (kg/cm$^2$) | 7.7 | 10.9 | 9.1 | 7.8[a] | 12.7 (2 hr) | 12.7 | 7.3 | 6.4 | 8.6 |
| 2 hr. Flexural Strength (kg/cm$^2$) | 14.5 | 14.1 | 11.4 | 11.4[b] | 13.6 (3 hr) | 11.4 | 10.4 | 10.0 | 15.4 |
| 24 hr. Flexural Strength (kg/cm$^2$) | 21.3 | 20.9 | 19.1 | 21.6[b] | 19.1 | 23.2 | 23.6 | 20.4 | 19.5 |

[a]Average of 4 measurements
[b]Average of 6 measurements

Examples 13–18

Using the binder prepared as in Examples 4–12 above at a level of 3 weight percent based on sand weight and having the ester compositions of Table 5 at a level of 10% based on resin weight, the effect of varying the ester blends of diacetin and triacetin on bench life and strip time in a system was determined and listed in Table 5. Table 5 lists the weight percent composition of the catalyst portion of the binder.

TABLE 5

| Example No. | 13 | 14 | 15 | 16 | 17 | 18 |
|---|---|---|---|---|---|---|
| Diacetin (wt. %) | 75 | 60 | 50 | 35 | 25 | 18 |
| Triacetin (wt. %) | 25 | 40 | 50 | 65 | 70 | 82 |
| Bench Life (min) | 3 | 7.5 | 11.5 | 17.5 | 58 | 93 |
| Strip Time (min) | 9 | 16.5 | 24.5 | 52 | 85 | 165 |

From all of the data above, it is apparent there has been provided, a system having various bench life and strip time properties which can be tailored for specific uses. Tables 2 and 3 further show there are improved shake out properties after the shape was exposed to 925° C.

Examples 19–24 and Comparative Example 3

Examples 19–24 and Comparative Example 3 study the effect of changing the sodium silicate to sodium phosphate ratio. In these examples the sodium phosphate was first dissolved in deionized water to form a 45 weight % solution. This solution was then mixed in the appropriate proportions with the sodium silicate solution (as shown in Table 6). This resulting binder was then added to the mixture of sand and catalyst. The binder coated sand was then tested for bench life, strip time, flexural strength and water softening as reported by Table 6.

TABLE 6

| Example No. | 19 | 20 | 21 | 22 | 23 | 24 | Comparative Example 3 |
|---|---|---|---|---|---|---|---|
| Sodium silicate -a | 75 | 70 | 65 | 60 | 55 | 50 | 100 |
| Sodium Polyphosphate Solution -b | 25 | 30 | 35 | 40 | 45 | 50 | 0 |
| Bench Life (min.) | 5.0 -c | 5.0 | 5.5 -c | 5.5 | 7.3 -c | 7.5 | 3 |
| Strip Time (min.) | 12.3 -c | 13.0 | 12.5 -c | 12.5 | 18.0 -c | 18.0 | 11 |
| Flexural Strength (kg/cm$^2$) | | | | | | | |
| 1 hour | 8.8 -d | 7.3 | 4.1 | 5 | 3.6 | 2.7 | 9.1 -g |
| 2 hours | 9.5 -e | 9.1 | 6.4 | 6.4 -f | 2.7 | 3.2 | 10.9 |
| 24 hours | 21.3 | 20 | 19.1 | 20.9 | 21.8 | 13.2 | 16.8 |
| Water Softening (seconds) -h | 91 | 46 | 41 | 34 | 16 | ND | greater than 600 |

Notes:
a Sodium silicate was SB41. Total liquid binder (silicate and phosphate) addition was 2.25% based on sand weight and propylene carbonate addition was 13.33% based on resin.
b Sodium polyphosphate was BUDIT 7 which has an average chain length of 16. BUDIT 7 was dissolved in deionized water to give a 45 weight % solution, prior to use.
c Average of 2 experiments.
d Flexural strengths were measured at 2 hours after preparation of specimen.
e Flexural strengths were measures at 3 hours after preparation of specimen.
f Flexural strengths were measured at 2.5 hours after preparation of specimen.
g Flexural strengths were measured at 1.5 hours after preparation of specimen.
h Water softening was measured of a specimen heated to 925° C. for 15 minutes and then cooled to ambient temperature.
ND equals not determined.

For water softening evaluation the broken sample obtained from the flexural strength measurement was heated for 15 minutes in a furnace maintained at 925° C. After cooling, a piece of each sample was placed in 20° C. water in a petri dish such that the water level was ⅓–¼ up the sample. The surface was continuously abraded with a metal spatula until the surface 2 mm or so became soft. This time was measured and is reported in Table 6 as a measure of water softening.

In addition to the data in Table 6, when cold, portions of the heat treated samples not employed for water softening were assessed for physical strength by simply pressing in the hand. They were all extremely weak so that no mechanical measurement could be made. Using this subjective test, all the samples were very similar except Comparative Example 3; the silicate standard was much harder than the other samples.

Examples 25–29

Examples 25–29 determine the effect of changing the SiO$_2$ to Na$_2$O ratio of the sodium silicate. For these Examples, the procedure of the above-described Examples 19–24 was repeated. However, sand tests were conducted with a binder system of 70 wt. % sodium silicate and 30 weight % BUDIT 7. Sodium silicate having different SiO$_2$ to Na$_2$O ratios was prepared by adding an appropriate quantity of 45 wt. % sodium hydroxide solution to SB41. Binder addition was 2.25% based on sand weight and propylene carbonate addition was 13.33% based on resin weight. The resulting bench life, strip time, flexural strength and water softening measured for the prepared samples are reported on Table 7.

TABLE 7

| Example No. | 25 | 26 | 27 | 28 | 29 |
|---|---|---|---|---|---|
| SiO$_2$ to Na$_2$O Ratio of Sodium Silicate | 2.65 | 2.3 | 2 | 1.7 | 1.4 |
| Bench Life (min.) | 6 -a | 10.5 | 10.8 -b | 11 | 14.8 -a |
| Strip Time (min.) | 14.5 -a | 15 | 17.5 -b | 17 | 31.0 -a |

TABLE 7-continued

| Example No. | 25 | 26 | 27 | 28 | 29 |
|---|---|---|---|---|---|
| Flexural Strength (kg/cm$^2$) | | | | | |
| 1 hour | 4.1 | 6.8 -b | 10.4 | 6.4 | 2.7 |
| 2 hours | 6.4 | 10.4 | 9.1 | 10 | 4.5 |
| 24 hours | 19.1 | 20.4 | 18.2 | 20.9 | 20.9 |
| Water Softening (seconds) -c | 44 | 111 | 112 | 81 | 90 | a Average of 2 experiments.
b Flexural strengths were determined at 1.5 hours after preparation of specimen.
c Water softening was measured of a specimen heated to 925° C. for 15 minutes and then cooled to ambient temperature.

The data of Table 7 shows the increasing alkalinity of the silicate increases work times without significantly influencing the flexural strength at 24 hours.

While the invention has been described in conjunction with the specific embodiments thereof, and with reference to the tables presented herein, it is evident that many alternatives, modifications and variations will be apparent to those skilled in the art in light of the foregoing description. For instance, the methods of the invention may include heating by a heat lamp to remove water and/or accelerate the rate of curing. Dehydration of the shaped mold may also be employed during curing by contacting the shaped mold with moving air. Vacuum dehydration could also be used. However, it is to be understood that for purposes of this specification, air is considered an inert gas and could be replaced with any other inert gas, such as nitrogen, argon, etc. or mixtures of inert gases. The temperature of the air or other inert gas are such that dehydration is accomplished and suitable results have been achieved at a temperature of ambient to 90° C. and above. Vacuum assist may be used alone, or may be used in combination, with the other embodiments to facilitate dehydration. Accordingly, it is intended that the present invention include all such alternatives, modifications and variations as set forth which are within the spirit and scope of the claims appended hereto.

What is claimed is:

1. A binder composition comprising:
   a mixture of a silicate, an amorphous inorganic phosphate glass, and a catalyst selected from the group consisting of aliphatic carbonates, cyclic alkylene carbonates, aliphatic carboxylic acid esters, cyclic carboxylic acid esters, phosphate esters and mixtures thereof,
   wherein the phosphate glass is a polyphosphate having an ionic moiety of formula $()(PO_3)_nO)$ wherein n is an average chain length of 3–32, and
   wherein the silicate is at least one selected from the group consisting of alkali metal silicates and ammonium silicates.

2. The composition of claim 1, wherein the catalyst comprises at least one aliphatic carbonate having a Formula I:

$$R^1\text{—}O\text{—}(CO)\text{—}O\text{—}R^2 \qquad I,$$

wherein $R^1$ and $R^2$ may be the same or different and are selected from $C_1$ to $C_6$ alkyl.

3. The composition of claim 1, wherein the catalyst comprises at least one cyclic alkylene carbonate having a Formula II:

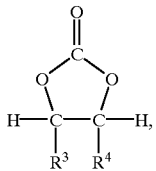

wherein $R^3$ and $R^4$ are independently selected from the group consisting of hydrogen and $C_1$ to $C_{10}$ alkyl.

4. The composition of claim 1, wherein the catalyst is selected from the group consisting of ethylene carbonate, propylene carbonate, butylene carbonate and mixtures thereof.

5. The composition of claim 1, comprising the aliphatic carboxylic acid esters, wherein the aliphatic carboxylic acid esters are the reaction product of an aliphatic carboxylic acid moiety and an aliphatic alcohol moiety, the aliphatic carboxylic acid moiety is selected from monocarboxylic acid having 1 to 20 carbon atoms and dicarboxylic acid having 2 to 20 carbon atoms, the aliphatic moiety is selected from the group consisting of aliphatic alcohols having 1 to 20 carbon atoms, aliphatic polyols having 1 to 20 carbon atoms, ether alcohols of Formula III (a):

$$R^5\text{—}(OR^6)_m\text{—}OH \qquad III(a),$$

wherein $R^5$ is a saturated or unsaturated alkyl moiety having 1 to 20 carbon atoms, each $R^6$ is independently an alkylene moiety having 2 to 4 carbon atoms, and m is an integer from 1 to 8, and ether polyols of Formula III (b):

$$R^7\text{—}(OR^8)_m\text{—}OH \qquad III(b),$$

wherein $R^7$ is a saturated or unsaturated alkyl moiety having 1 to 20 carbon atoms, each $R^8$ is independently an alkylene moiety having 2 to 4 carbon atoms, and m is as defined in Formula III (a), with the proviso that at least one of $R^7$ or $R^8$ is hydroxy substituted in addition to the hydroxy group shown in Formula III (b).

6. The composition of claim 5, wherein the catalyst comprises at least one aliphatic carboxylic acid ester having the Formula IV (a):

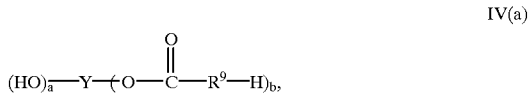

wherein a is an integer from 0 to 5, b is an integer from 1 to 6, $R^9$ is $C_1$ to $C_{20}$ alkylene, and Y is $C_cH_{2c-a-b+2}$, wherein c is an integer from 2 to 20, the sum of a and b is at most 6,
   optionally at least one —OH group of Formula IV (a) is bonded to Y through an ether group of formula $(OR^6)_m$, and optionally at least one —(O—C(O)—$R^9$—H) group of Formula IV (a) is bonded to Y through another ether group of formula $(OR^6)_m$, wherein each $R^6$ is independently an alkylene moiety having 2 to 4 carbon atoms and each m is independently an integer from 1 to 8.

7. The composition of claim 6, wherein the catalyst comprises at least one carboxylic acid ester having a Formula IV (c):

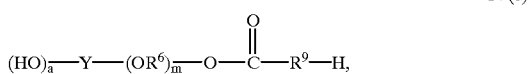

wherein a is an integer from 0 to 5, each $R^6$ is independently an alkylene moiety having 2 to 4 carbon atoms, Y is $C_cH_{2c-a+1}$, wherein c is an integer from 2 to 20, m is an integer from 1 to 8, and $R^9$ is $C_1$ to $C_{20}$ alkylene.

8. The composition of claim 5, wherein the catalyst comprises at least one carboxylic acid ester having a Formula V:

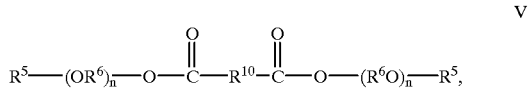

wherein each $R^5$ and $R^6$ are independently as defined in Formula III (a), n=0 to 8, and $R^{10}$ is a bond or $C_1$ to $C_{18}$ alkylene.

9. The composition of claim 1, wherein the catalyst comprises at least one cyclic carboxylic acid ester having a Formula VI:

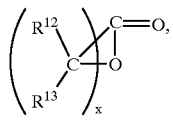

wherein x equals 2 to 10 and $R^{12}$ and $R^{13}$ may be independently selected from the group consisting of H and $C_1$ to $C_4$ alkyl and mixtures thereof.

10. The composition of claim 1, wherein the catalyst comprises at least one phosphate ester having a Formula VIII:

$$OP(OR^{14})_3 \qquad VIII,$$

wherein each $R^{14}$ is independently selected from the group consisting of H, linear or branched $C_1$ to $C_{16}$ alky, —$C_6H_5$, —$C_6H_4R^{15}$, wherein $R^{15}$ is linear or branched $C_1$ to $C_{12}$ alkyl, and —$R^{16}$—$C_6H_5$, wherein $R^{16}$ is linear or branched $C_1$ to $C_6$ alkylene, at most two $R^{14}$ groups being H.

11. The composition of claim 1, wherein the catalyst is selected from the group consisting of dimethyl succinate, dimethyl glutarate, dimethyl adipate, propiolactone, butyrolactone, caprolactone, monoacetin, diacetin, triacetin, ethylene glycol diacetate, diethylene glycol diacetate and mixtures thereof.

12. The composition of claim 1, wherein the catalyst is present in amounts of from about 5 to 25% by weight based on the weight of the binder.

13. A composition for making shapes of particulate material, comprising the binder of claim 1 and particulate material.

14. The composition of claim 13, wherein the particulate material is sand, and the sand is present in amounts of 95–99.6% by weight based on the total weight of the composition.

15. The composition of claim 1, wherein the silicate has a ratio of $SiO_2$:$Na_2O$ from 1.1:1 to 3.85:1.

16. The composition of claim 1, wherein the silicate has an $SiO_2$/$Na_2O$ ratio range of from 2.0:1–2.7:1.

17. A The composition of claim 1, wherein the phosphate is at least one selected from the group consisting of alkali metal phosphates and ammonium phosphates.

18. The composition of claim 1, wherein the silicate comprises sodium silicate and the phosphate is at least one polyphosphate selected from the group consisting of sodium polyphosphate and potassium polyphosphate.

19. The composition of claim 1, wherein the phosphate component of the binder is a sodium polyphosphate.

20. The composition of claim 1, further comprising a surfactant.

21. The composition of claim 1, further comprising a water-soluble anionic surfactant selected from the group consisting or organic sulphates, organic sulphonates, organic phosphate esters and mixtures thereof.

22. The composition of claim 1, wherein the silicate:phosphate ratio is about 97.5:2.5 to about 40:60 by weight based on solids.

23. The composition of claim 1, wherein the silicate:phosphate ratio is about 95:5 to 60:40 by weight based on solids.

24. A system of ingredients for being mixed to form a binder comprising a dry silicate component, a dry an amorphous inorganic phosphate glass component, and a catalyst selected from the group consisting of aliphatic carbonates, cyclic alkylene carbonates, aliphatic carboxylic acid esters, cyclic carboxylic acid esters, phosphate esters and mixtures thereof,
wherein the phosphate glass is a polyphosphate having an ionic moiety of formula (($PO_3$)$_n$O) wherein n is an average chain length of 3–32, and
wherein the silicate is at least one selected from the group consisting of alkali metal silicates and ammonium silicates.

25. A method for making a binder comprising mixing a silicate, an amorphous inorganic phosphate glass, and a catalyst selected from the group consisting of aliphtic carbonates, cyclic alkylene carbonates, aliphatic carboxylic acid esters, cyclic carboxylic acid esters, phosphate esters and mixtures thereof,
wherein the phosphate glass is a polyphosphate having an ionic moiety of formula (($PO_3$)$_n$O) wherein n is an average chain length of 3–32, and
wherein the silicate is at least one selected from the group consisting of alkali metal silicates and ammonium silicates.

26. The method of claim 25, wherein the catalyst is at least one catalyst selected from the group consisting of
(A) alkylene carbonates of Formula I:

$$R^1\text{—O—(CO)—O—}R^2 \qquad \text{I,}$$

wherein $R^1$ and $R^2$ may be the same or different and are selected from $C_1$ to $C_6$ alkyl,
(B) cyclic organic carbonates of Formula II,

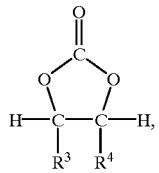

II wherein $R^3$ and $R^4$ are independently selected from the group consisting of hydrogen and a $C_1$ to $C_{10}$ alkyl,
(C) aliphatic carboxylic acid esters, wherein the aliphatic carboxylic acid esters,
wherein the aliphatic carboxylic add esters are the reaction product of an aliphatic carboxylic acid moiety and an aliphatic alcohol moiety, the aliphatic carboxylic acid moiety is selected from monocarboxylic acid having 1 to 20 carbon atoms and dicarboxylic acid having 2 to 20 carbon atoms, the aliphatic moiety is selected from the group consisting of aliphatic alcohols having 1 to 20 carbon atoms, aliphatic polyols as having 1 to 20 carbon atoms, ether alcohols of Formula III (a):

$$R^5\text{—}(OR^6)_m\text{—OH} \qquad \text{III(a),}$$

wherein $R^5$ is a saturated or unsaturated alkyl moiety having 1 to 20 carbon atoms, each $R^6$ is independently an alkylene moiety having 2 to 4 carbon atoms, and m is an integer from 1 to 8, and ether polyols of Formula III (b):

$$R^7\text{—}(OR^8)_m\text{—OH} \qquad \text{III (b),}$$

wherein $R^7$ is a saturated or unsaturated alkyl moiety having 1 to 20 carbon atoms, each $R^8$ is independently an alkylene moiety having 2 to 4 carbon atoms, and m is as defined in Formula III (a), with the proviso that at least one of $R^7$ or $R^8$ is hydroxy substituted in addition to the hydroxy group shown in Formula II (b),
(D) cyclic carboxylic acid ester of Formula VI:

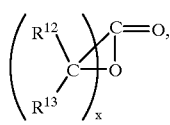

VI wherein x equals 2 to 10, $R^{12}$ and $R^{13}$ may be independently selected from the group consisting of H and $C_1$ to $C_4$ alkyl and mixtures thereof; and
(E) phosphate esters having a Formula VIII:

$$OP(OR^{14})_3 \qquad \text{VIII,}$$

wherein each $R^{14}$ is independently selected from the group consisting of H, linear or branched $C_1$ to $C_{16}$ alkyl, $C_6H_5$, $C_6H_4R^{15}$, wherein $R^{15}$ is linear or branched $C_1$ to $C_{12}$ alkyl, and —$R^{16}$—$C_6H_5$, wherein $R^{16}$ is linear or branched $C_1$ to $C_6$ alkylene, at most two $R^{14}$ groups being H.

27. The method of claim 25, wherein the catalyst is selected from the group consisting of dimethyl succinate, dimethyl glutarate and dimethyl adipate, propiolactone, butyrolactone, caprolactone, monoacetin, diacetin, triacetin, ethylene glycol diacetate, diethylene glycol diacetate, and mixtures thereof.

28. The method of claim 25, wherein the catalyst is selected from the group consisting of ethylene carbonate, propylene carbonate, butylene carbonate and mixtures thereof.

29. A method for binding particulate materials with a binder comprising:

providing the composition of claim 13, shaping the composition; and allowing the composition to cure.

30. The method of claim 29, wherein said providing step comprises adding at least one said silicate, at least one said phosphate, and at least one said catalyst to the particulate material to form the composition.

31. The method of claim 30 wherein the silicate and phosphate are added to the particulate material prior to adding the catalyst.

32. The method of claim 30, further comprising adding water to the particulate material to form an aqueous mixture, wherein the particulate material is foundry sand, the silicate is a sodium silicate, and the sodium silicate and phosphate are added to the aqueous mixture.

33. The method of claim 29, wherein the shaping step comprises charging the mixture into a pattern.

34. The method of claim 29, wherein the providing of the composition comprises forming in situ the phosphate.

35. The method of claim 34, wherein the forming in situ comprises contacting a phosphoric acid with a base.

36. The method of claim 34, wherein the forming in situ comprises contacting a precursor phosphate with a member of the group consisting of an acid and a base to form the in situ phosphate.

37. The method of claim 29, wherein the composition is aqueous and formed by mixing the particulate material, the silicate, the phosphate, and water.

38. A water collapsible mold comprising, a shaped mass of particles, the individual particles of the mass are bound together with a binder comprising at least one water soluble silicate and at least one water soluble amorphous inorganic phosphate glass, and at least one catalyst selected from the group consisting of aliphatic carbonates, cyclic organic carbonates, aliphatic carboxylic acid esters, cyclic carboxylic acid esters, phosphate esters and mixtures thereof, wherein the phosphate is a polyphosphate having an ionic moiety of formula $((PO_3)_nO)$ wherein n is an average chain length of 3–32, and wherein the silicate is at least one selected from the group consisting of alkali metal silicates and ammonium silicates, the resulting binder being water soluble.

39. The mold of claim 38, wherein the mold is water collapsible after exposure to a temperature in the range of 500°–1400° C.

40. The mold of claim 38, wherein the particles are made of at least one material selected from the group consisting of silica, alumina, silicon carbide, magnesite, dolomite, aluminum silicate, mullite, carbon, forsterite, chrome ore-magnesite, zircon, clay, chromite, chamotte and olivine.

41. The mold of claim 38, wherein the binder provides the mold with dry shakeout properties.

42. The mold of claim 38, wherein said phosphate has "n" number of phosphate units $((PO_3)_nO)$ wherein n is a number average from 3 to 32 inclusive.

43. The mold of claim 42, wherein n is 4 to 21 inclusive.

44. The mold of claim 42, wherein no isomorphic replacement of silicate ions with phosphate ions occurs prior to mixing the sand with the binder.

45. A method for making a metal casting comprising providing a mold according to claim 38 and casting a molten metal against said mold.

46. A method for binding particulate materials with a binder, the method comprising:

providing an aqueous binder system comprising a mixture of at least one silicate, at least one amorphous inorganic phosphate glass, at least one a catalyst selected from the group consisting of aliphatic carbonates, cyclic alkylene carbonates, aliphatic carboxylic acid esters, cyclic carboxylic acid esters, phosphate esters and mixtures thereof, and the particulate materials to be bonded; wherein said providing step comprises forming in situ the phosphate, wherein the phosphate is a polyphosphate having an ionic moiety of formula $((PO_3)_nO)$ wherein n is an average chain length of 3–32, and wherein the silicate is at least one selected from the group consisting of alkali metal silicates and ammonium silicates.

* * * * *